US010883466B2

(12) United States Patent
Kotani

(10) Patent No.: US 10,883,466 B2
(45) Date of Patent: Jan. 5, 2021

(54) HIGH ALTITUDE AIR START EQUIPMENT FOR AIRCRAFT RECIPROCATING ENGINE

(71) Applicant: SUBARU CORPORATION, Tokyo (JP)

(72) Inventor: Kazuaki Kotani, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 3 days.

(21) Appl. No.: 16/246,903

(22) Filed: Jan. 14, 2019

(65) Prior Publication Data
US 2019/0234365 A1    Aug. 1, 2019

(30) Foreign Application Priority Data
Jan. 30, 2018    (JP) .................................. 2018-013325

(51) Int. Cl.
F02N 9/04      (2006.01)
F02B 37/11     (2006.01)
F02B 37/14     (2006.01)
B64D 41/00     (2006.01)
F02B 29/04     (2006.01)
F02M 35/10     (2006.01)
F02B 39/10     (2006.01)

(52) U.S. Cl.
CPC .............. F02N 9/04 (2013.01); B64D 41/00 (2013.01); F02B 29/04 (2013.01); F02B 37/11 (2013.01); F02B 37/14 (2013.01); F02B 39/10 (2013.01); F02M 35/10236 (2013.01); F02M 35/10295 (2013.01)

(58) Field of Classification Search
CPC .. F02N 9/04; F02B 39/10; F02B 29/04; F02B 37/14; F02B 37/11; F02M 35/10295; F02M 35/10236; B64D 41/00; B64D 31/00; B64D 27/04

USPC ................................ 60/625–629, 605.1–612
See application file for complete search history.

(56) References Cited

U.S. PATENT DOCUMENTS 2,422,162 A * 6/1947 Borell ..................... F02B 37/14
                                                                60/602
2,699,218 A * 1/1955 Nims ..................... B64D 31/00
                                                                416/28
2,986,005 A * 5/1961 Dudley .................... F02C 7/272
                                                                60/789
(Continued)

FOREIGN PATENT DOCUMENTS

JP    2007-332925 A    12/2007
JP    2008-106728 A    5/2008
(Continued)

OTHER PUBLICATIONS

Notice of Reasons for Refusal dated Jul. 23, 2019 in corresponding Japanese Application No. 2018-013325.

Primary Examiner — Hoang M Nguyen
(74) Attorney, Agent, or Firm — Troutman Pepper Hamilton Sanders LLP

(57) ABSTRACT

A high altitude air start equipment for an aircraft reciprocating engine includes: a compressor configured to suck and compress air, and supply the compressed air to the aircraft reciprocating engine; and a motor configured to supply the compressed air to the reciprocating engine to restart the reciprocating engine or to restore output by outputting rotational power to the compressor when the reciprocating engine stops or malfunctions during flight of the aircraft.

8 Claims, 6 Drawing Sheets

(56) References Cited

U.S. PATENT DOCUMENTS

| | | | | |
|---|---|---|---|---|
| 3,783,613 | A | * | 1/1974 | Billings ................. F01K 15/02 |
| | | | | 60/626 |
| 4,741,164 | A | * | 5/1988 | Slaughter ................ F02N 9/04 |
| | | | | 123/198 DB |
| 5,341,644 | A | * | 8/1994 | Nelson ................... F02B 63/00 |
| | | | | 123/2 |
| 2010/0100300 | A1 | | 4/2010 | Brooks et al. |
| 2014/0230430 | A1 | | 8/2014 | Krug et al. |
| 2015/0151847 | A1 | | 6/2015 | Krug et al. |
| 2015/0246733 | A1 | | 9/2015 | Silet et al. |
| 2019/0023412 | A1 | | 1/2019 | Krug et al. |

FOREIGN PATENT DOCUMENTS

| | | | |
|---|---|---|---|
| JP | 2012-503732 | A | 2/2012 |
| JP | 2014-159810 | A | 9/2014 |
| JP | 2015-107795 | A | 6/2015 |
| JP | 2015-531721 | A | 11/2015 |

\* cited by examiner

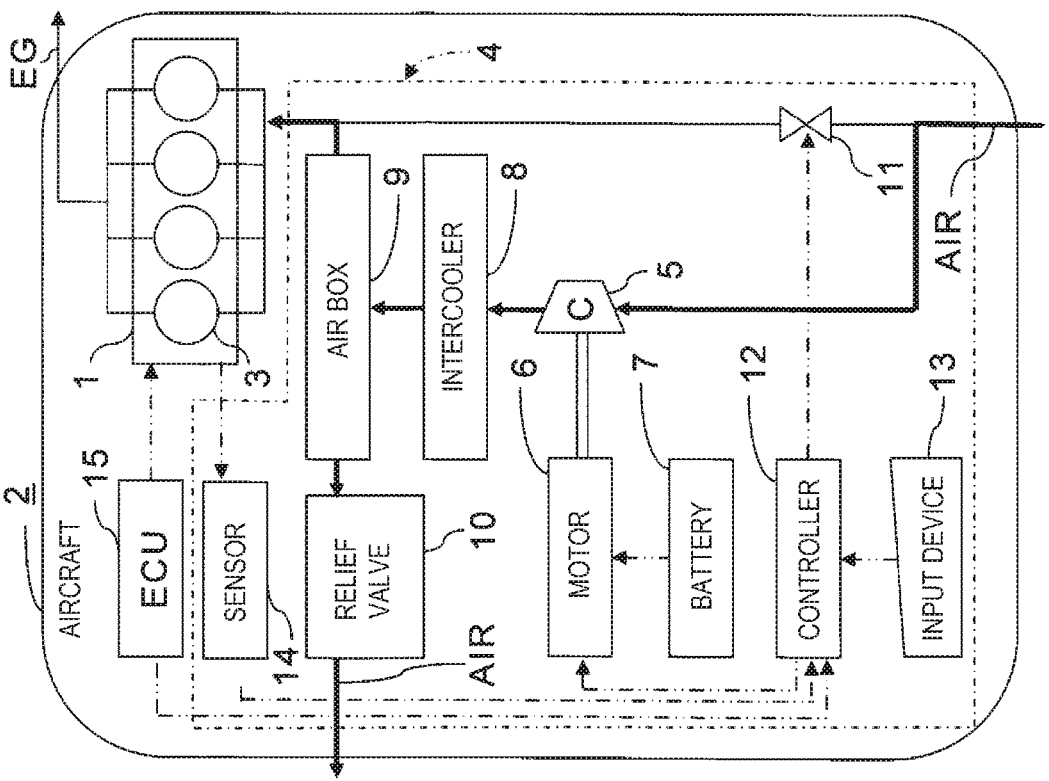
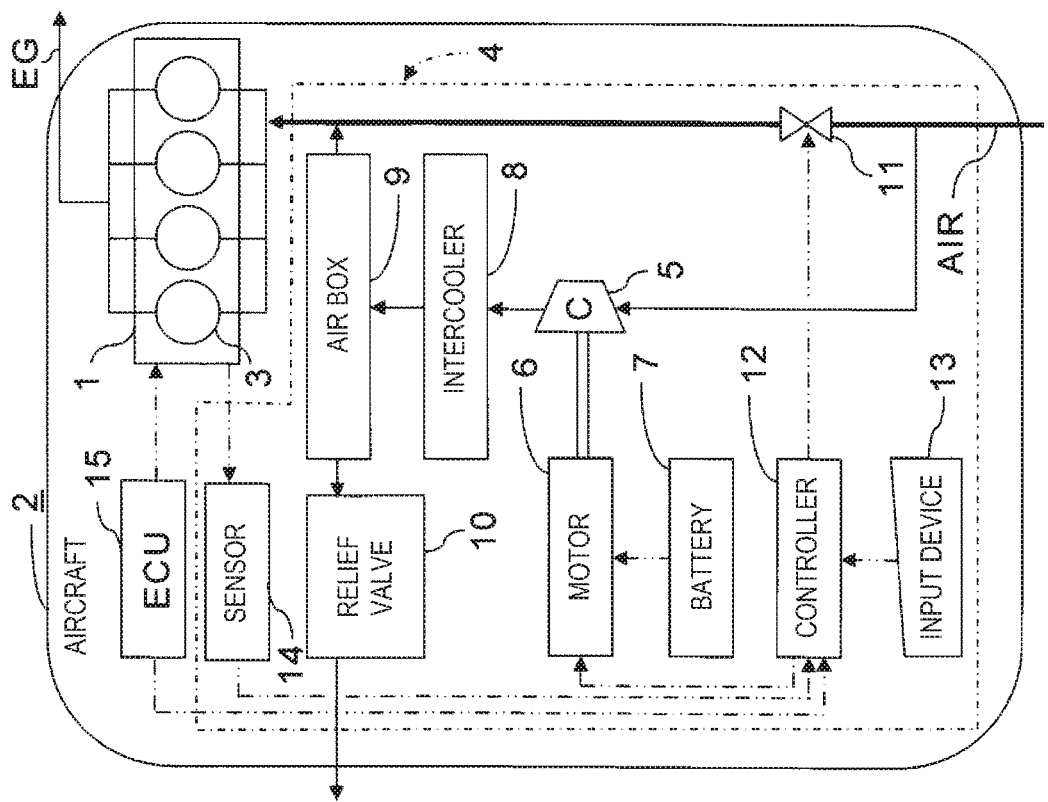

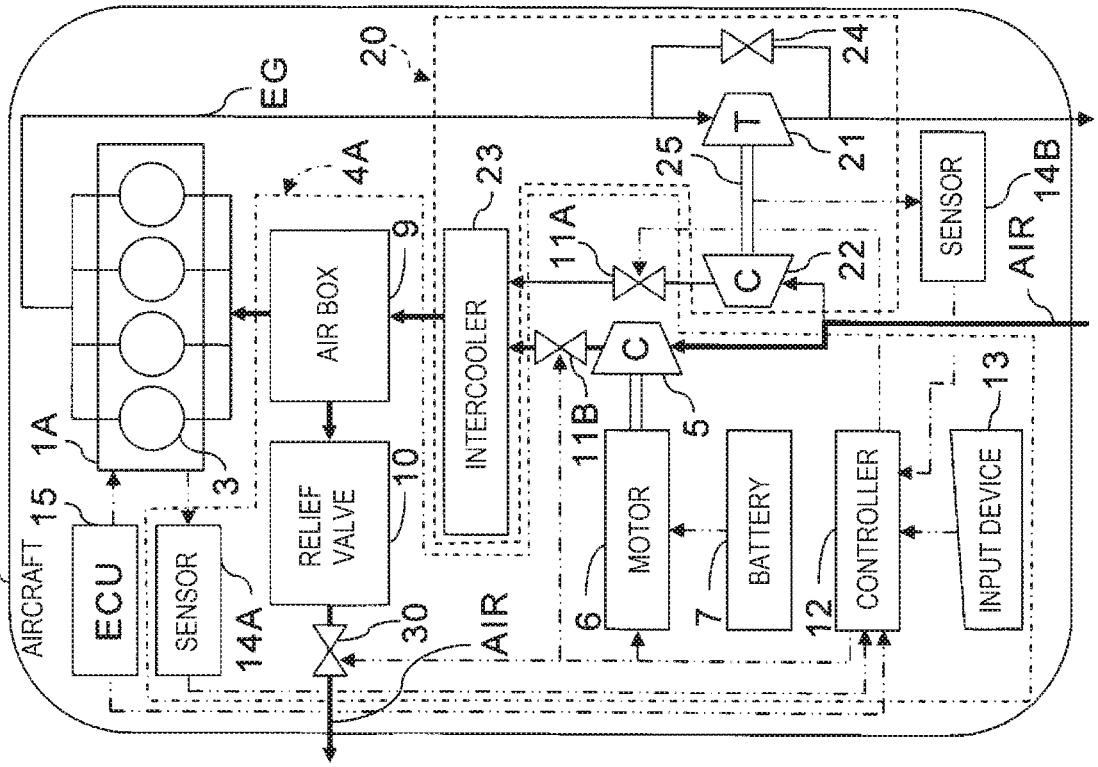
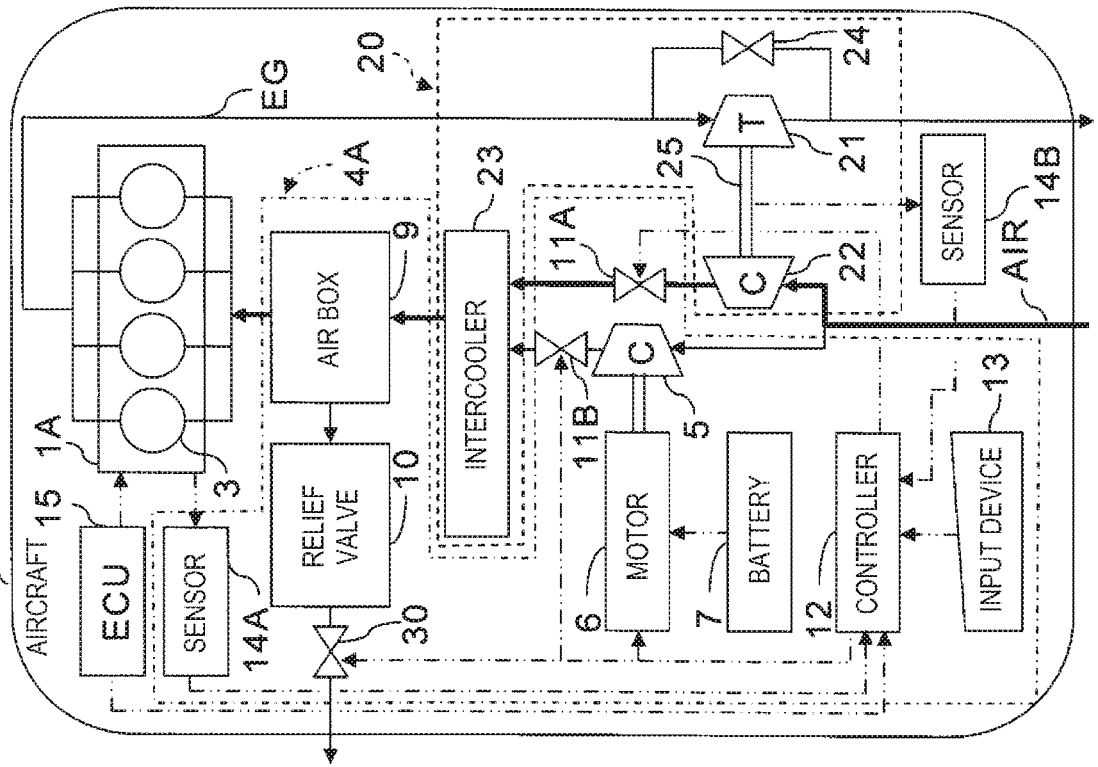

HIGH ALTITUDE AIR START EQUIPMENT FOR AIRCRAFT RECIPROCATING ENGINE

CROSS-REFERENCE TO RELATED APPLICATIONS

The present application claims priority from Japanese Patent Application No. 2018-013325 filed on Jan. 30, 2018, the entire contents of which are hereby incorporated by reference.

BACKGROUND

1. Technical Field

Examples of the present invention relate to a high altitude air start equipment for an aircraft reciprocating engine, an aircraft reciprocating engine, and an aircraft.

2. Related Art

In related arts, aircrafts with reciprocating engines have been designed and manufactured. Such a reciprocating engine has a motor that converts part of the energy generated by combustion of fuel into reciprocating motion of a piston as expansion work, which is in turn converted into rotational motion of a rotating body connected to the piston. An aircraft such as a small-propeller aircraft powered by a reciprocating engine is called a reciprocating aircraft.

The reciprocating aircraft in which a supercharger is disposed in the reciprocating engine is also known as disclosed in Japanese Unexamined Patent Application Publication (JP-A) No. 2014-159810, JP-A No. 2008-106728 or JP-A No. 2012-503732. A supercharger is an auxiliary apparatus that uses the flow of exhaust gas to rotate a turbine and transmits rotational energy of the turbine to rotate a compressor, thereby increasing the pressure of air supplied to the reciprocating engine. In particular, a supercharger driven by a turbine rotated with exhaust gas is called a turbocharger.

SUMMARY OF THE INVENTION

An aspect of the present invention provides a high altitude air start equipment for an aircraft reciprocating engine. The starter includes: a compressor configured to suck and compress air, and supply the compressed air to the aircraft reciprocating engine; and a motor configured to supply the compressed air to the reciprocating engine to restart the reciprocating engine or to restore output by outputting rotational power to the compressor when the reciprocating engine stops or malfunctions during flight of the aircraft.

The aircraft reciprocating engine according to the example of the present invention is provided with the above-mentioned high altitude air start equipment.

The aircraft according to the example of the present invention includes the aircraft reciprocating engine described above.

BRIEF DESCRIPTION OF THE DRAWINGS

FIGS. 4A and 4B are diagrams illustrating the flow of air during non-operation and operation of the high altitude air start equipment under control of the controller illustrated in FIG. 1.

FIGS. 6A and 6B illustrate the flow of air during non-operation and operation of the high altitude air start equipment under control of the controller illustrated in FIG. 5.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

If an engine of an aircraft stops in the sky, the operation of restarting the engine is one of the critical emergency operations for the pilot. If the engine stops during the flight of an aircraft with a conventional reciprocating engine, the conventional engine is restarted after the speed of the aircraft has been brought to an appropriate speed.

Although the procedure for restarting the reciprocating engine is not complicated, adjustment of the choke is temporarily required for increasing the proportion of fuel in the gas mixture of fuel and air to be combusted in the engine because of the restarting engine being under the conditions in which the air pressure is lower than the air pressure on the ground. Further, restarting the reciprocating engine is a very stressful operation for the pilot due to the temporal pressure of having to restart the engine quickly. Moreover, since the reciprocating engine is started in a low-density air, exhaust gas temperature (i.e., EGT) rises rapidly and often exceeds a specified air temperature, resulting in a start called a hot start.

Further, the turbocharger also stops if the reciprocating engine of the reciprocating aircraft provided with the turbocharger is stopped while flying at high altitude. Therefore, it becomes necessary to lower the altitude of the reciprocating aircraft and then restart the reciprocating engine in order to supply air having sufficient pressure to the pistons of the reciprocating engine.

It is desirable to enable the reciprocating engine to be restarted more safely and easily when the reciprocating engine stops during the flight of the aircraft provided with the reciprocating engine.

First Example

Figure 1:
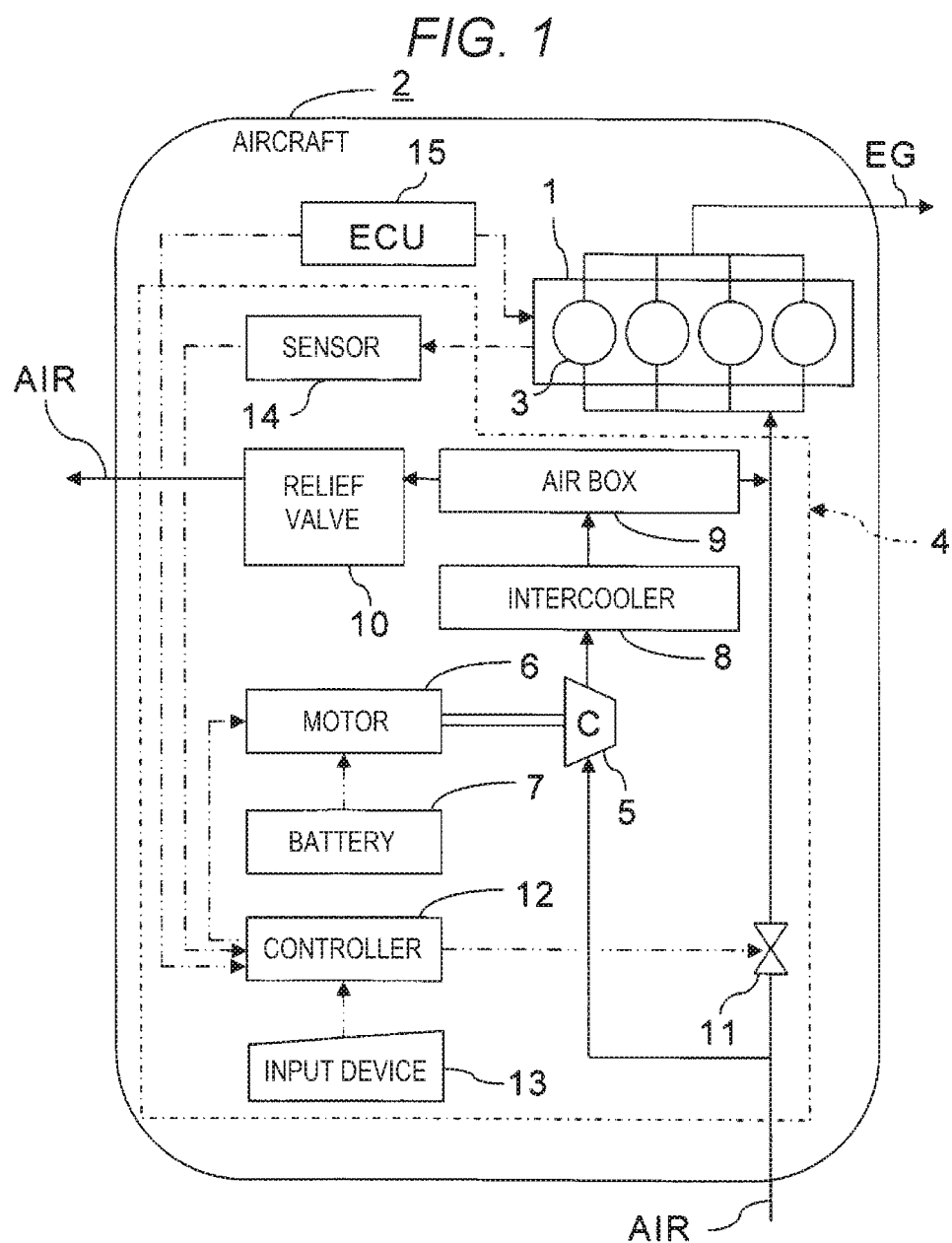
FIG. 1 is a configuration diagram of an aircraft reciprocating engine provided with a high altitude air start equipment according to a first example of the present invention.

FIG. 1 is a configuration diagram of an aircraft reciprocating engine provided with a high altitude air start equipment according to a first example of the present invention.

An aircraft reciprocating engine 1 is disposed in an aircraft 2 such as a small-propeller aircraft. An aircraft reciprocating engine 1 includes a plurality of pistons 3, and is a motor for outputting rotational torque to rotate a propeller with reciprocating movement of the pistons 3. Each of the pistons 3 reciprocates by combustion of a gas mixture of air and aviation fuel. In order to reciprocate the pistons 3 of the aircraft reciprocating engine 1, it is necessary to supply air at an appropriate pressure and flow rate.

When the aircraft reciprocating engine 1 is started in a stable manner, it is necessary to temporarily supply air having a high pressure of about atmospheric pressure to the aircraft reciprocating engine 1. When starting the aircraft reciprocating engine 1 on the ground before the aircraft 2 takes off, air at atmospheric pressure can be supplied to the aircraft reciprocating engine 1.

However, if the aircraft reciprocating engine 1 stops while the aircraft 2 is flying high, air having a pressure lower than atmospheric pressure must be taken in order to restart the aircraft reciprocating engine 1. Therefore, conditions such as air pressure and the like are different from those in the case of starting the aircraft reciprocating engine 1 on the ground.

For this reason, the aircraft reciprocating engine 1 is provided with a high altitude air start equipment 4. The high altitude air start equipment 4 is an auxiliary apparatus for the aircraft reciprocating engine 1 for restarting the aircraft 2 in flight in the same manner as when the aircraft reciprocating engine 1 for aircraft starts on the ground.

As illustrated in FIG. 1, the high altitude air start equipment 4 may include a compressor 5, a motor 6, a battery 7, an intercooler 8, an air box 9, a relief valve 10, an intake air selection valve 11, a controller 12, an input device 13, and a sensor 14.

The compressor 5 is a device configure to suck in outside air from the atmosphere, compress the air, and then supply the compressed air to the reciprocating engine 1 of the aircraft 2. Therefore, the inlet of the compressor 5 is connected to a pipe for intake air, and the outlet of the compressor 5 is connected to a pipe for supplying compressed air to the reciprocating engine 1.

The capacity of the compressor 5 is set to respond to changes in air flow rate from when the reciprocating engine 1 stops at high altitude to when it starts. That is, the capacity of the reciprocating engine 1 is set so that the pressure of air supplied to the pistons 3 of the reciprocating engine 1 is not insufficient to restart the reciprocating engine 1 at high altitude. For this reason, the reciprocating engine 1 can be started with a supply of air having a sufficient pressure at high altitude.

The motor 6 is a power device that rotates the compressor 5 by outputting rotational power to the compressor 5. Therefore, the rotation shaft of the compressor 5 and the output shaft of the motor 6 are mechanically coupled with a shaft so that rotational torque of the motor 6 is transmitted to the rotation shaft of the compressor 5. A gear or a belt may be used as necessary.

The motor 6 is driven when the reciprocating engine 1 stops during flight of the aircraft 2. Therefore, when the reciprocating engine 1 stops during flight of the aircraft 2, compressed air for restarting the reciprocating engine 1 can be supplied from the compressor 5 to the reciprocating engine 1 by outputting rotational power from the motor 6 to the compressor 5.

The battery 7 is a power source for supplying electrical power to the motor 6 when the motor 6 is driven. Accordingly, the battery 7 is connected to the motor 6 by an electrical cable.

The intercooler 8 is disposed on the compressed air pipe between the compressor 5 and the reciprocating engine 1, and the intercooler 8 is a heat exchanger for cooling the air compressed by the compressor 5. That is, when the air is compressed by the compressor 5, the temperature of the air rises. Therefore, the compressed air whose temperature has risen is cooled by the intercooler 8.

The air box 9 is disposed between the compressor 5 and the reciprocating engine 1. The air box 9 is a container for mitigating pressure fluctuations of the compressed air supplied from the compressor 5 to the reciprocating engine 1. Therefore, it is appropriate to dispose the compressed air pipe in a stage before the pistons 3 constituting the reciprocating engine 1.

In the instance illustrated in FIG. 1, the outlet of the intercooler 8 and the inlet of the air box 9 are connected by the compressed air pipe. A compressed air pipe connected to the outlet of the air box 9 splits up and connects to the pistons 3 constituting the reciprocating engine 1.

The relief valve 10 is a valve for regulating the pressure of the compressed air supplied from the compressor 5 to the reciprocating engine 1 by discharging to the atmosphere excess air from the air compressed by the compressor 5. For this reason, the relief valve 10 is directly or indirectly connected to the compressed air pipe connected between the compressor 5 and the reciprocating engine 1.

In the instance illustrated in FIG. 1, a relief valve 10 is indirectly connected to the compressed air pipe connected between the compressor 5 and the reciprocating engine 1. Specifically, the inlet of the relief valve 10 is connected to the compressed air pipe connected to the air box 9. The outlet of the relief valve 10 is connected to a pipe for air released to the atmosphere. Therefore, the pressure of the compressed air in the air box 9 is adjusted by the relief valve 10.

The relief valve 10 is a valve for maintaining a constant pressure of a target fluid by relieving excess fluid. A typical relief valve 10 is configured such that when the pressure of the fluid reaches a constant pressure, the spring expands and opens to relieve excess fluid. As a result, if the pressure of the compressed air adjusted by the relief valve 10 is adjusted to within a pressure range R defined as the specification of the reciprocating engine 1, the compressed air having an appropriate pressure can be supplied to each piston 3 of the reciprocating engine 1.

That is, since the pressure of the compressed air in the air box 9 becomes the setting pressure of the relief valve 10, compressed air with a desired pressure can be supplied to each piston 3 of the reciprocating engine 1 by adjusting the setting pressure of the relief valve 10.

As a practical instance, the setting pressure of the relief valve 10 can be set to atmospheric pressure. In other words, when the absolute pressure is expressed with reference to an absolute vacuum, the setting pressure of the relief valve 10 can be set to 1 atm. One atmosphere of absolute pressure corresponds to atmospheric pressure and is 0.101 MPa.

Further, when expressed in gauge pressure in reference to atmospheric pressure, the atmospheric pressure is zero.

When the setting pressure of the relief valve 10 is set to atmospheric pressure, compressed air at atmospheric pressure can be supplied to each piston 3 of the reciprocating engine 1. Therefore, even when the aircraft 2 is flying over the ground, air can be supplied to the pistons 3 of the reciprocating engine 1 under the same conditions as conditions on the ground. As a result, the reciprocating engine 1 can be restarted with the same operation as when the aircraft 2 takes off.

Figure 2:
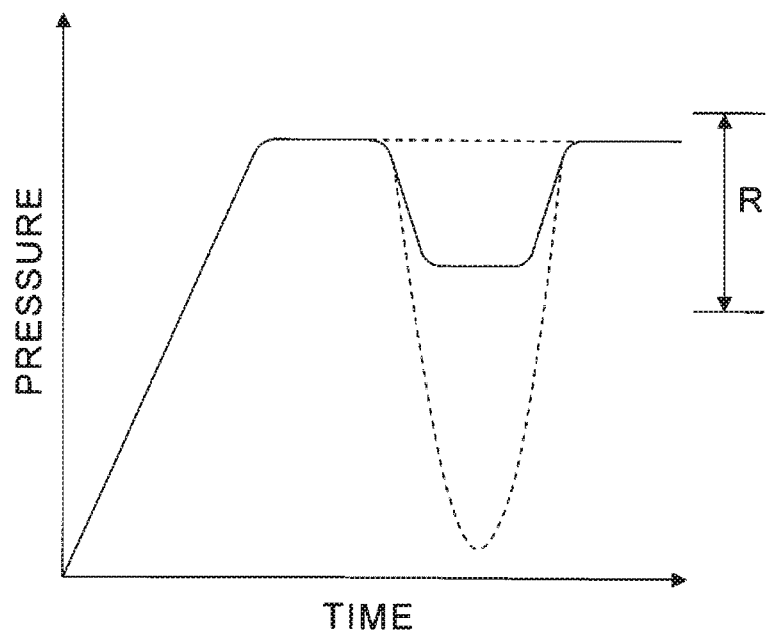
FIG. 2 is a graph illustrating pressure changes of compressed air supplied to a reciprocating engine from the high altitude air start equipment illustrated in FIG. 1.

FIG. 2 is a graph illustrating a change in pressure of compressed air supplied from the high altitude air start equipment 4 illustrated in FIG. 1 to the reciprocating engine 1.

In FIG. 2, the horizontal axis represents time, and the vertical axis represents the pressure of compressed air supplied to each piston 3 of the reciprocating engine 1. When the compressor 5 is operated, the pressure of air supplied to the reciprocating engine 1 gradually increases. When the pressure of air reaches the setting pressure of the relief valve 10, the air leaks from the relief valve 10 so that the pressure of air becomes constant.

When the reciprocating engine 1 is started, the pressure of air supplied to the reciprocating engine 1 temporarily decreases. Without the air box 9, the pressure of the compressed air supplied to the reciprocating engine 1 may become lower than the pressure range R of air required to drive the reciprocating engine 1 depending on the altitude of the aircraft 2, as illustrated by the dotted line. This is because, unlike the case where the aircraft 2 is on the ground, the pressure of air supplied to the compressor 5 is lower than atmospheric pressure and decreases as the altitude of the aircraft 2 increases.

Therefore, it is appropriate to provide the air box 9 so that the pressure of air supplied to the reciprocating engine 1 immediately after starting the reciprocating engine 1 is not lower than the pressure range R of the air required to drive the reciprocating engine 1. By providing the air box 9 of an appropriate size, as illustrated by the solid line in FIG. 2, even if the pressure of air supplied to the reciprocating engine 1 is temporarily lowered immediately after starting the reciprocating engine 1, the pressure of air supplied to the reciprocating engine 1 can be kept within the pressure range R of air required to drive the reciprocating engine 1.

Figure 3:
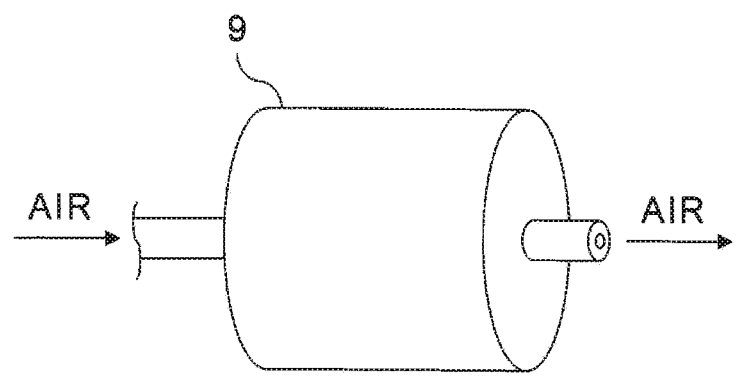
FIG. 3 is a perspective view illustrating an exemplary shape of an air box illustrated in FIG. 1.

FIG. 3 is a perspective view illustrating an exemplary shape of the air box 9 illustrated in FIG. 1.

As illustrated in FIG. 3, the air box 9 may be formed from a container of any shape having a width larger than the inner diameter of the compressed air pipe. The size of the air box 9, that is, the volume of the air box 9, can be determined based on a change in the amount of air sucked into the reciprocating engine 1 and the setting pressure of the relief valve 10.

More specifically, as illustrated in FIG. 2, even when the pressure of compressed air locally drops from the setting pressure of the relief valve 10 due to a change in the amount of air sucked in upon starting the reciprocating engine 1, the size of the air box 9 can be set so that the pressure of compressed air becomes the pressure range R of the air necessary to drive the reciprocating engine 1.

On the other hand, as described above, it is important to determine the capacity of the compressor 5 so that compressed air having a pressure within the pressure range R of air required to drive the reciprocating engine 1 can be supplied to the reciprocating engine 1 at all times regardless of pressure fluctuations of the compressed air. That is, it is important to determine the capacity of the compressor 5 so as not to cause an insufficient flow rate of air to the reciprocating engine 1.

Supplying of compressed air to the reciprocating engine 1 for restarting is not necessary after restarting the reciprocating engine 1 and also during operation of the reciprocating engine 1 during flight of the aircraft 2. Therefore, air not compressed by the compressor 5 is supplied to the reciprocating engine 1 during these periods.

The intake air selection valve 11 is a valve for switching between the supply of air compressed by the compressor 5 to the reciprocating engine 1 and the supply of air not compressed by the compressor 5 to the reciprocating engine 1.

In the instance illustrated in FIG. 1, the intake air selection valve 11 is provided to a pipe for taking in air from the atmosphere and directly supplying the air to each piston 3 of the reciprocating engine 1 without passing the air through the high altitude air start equipment 4. Air pipe branches out on the upstream side of the intake air selection valve 11, and the downstream side of the branched off portion of air pipe is connected to an inlet of the compressor 5, disposed in the high altitude air start equipment 4. Therefore, by opening the intake air selection valve 11, air taken in from the atmosphere can be supplied to the pistons 3 of the reciprocating engine 1 without being compressed by the compressor 5 of the high altitude air start equipment 4. On the other hand, if the intake air selection valve 11 is closed, air taken in from the atmosphere can be compressed by the compressor 5 of the high altitude air start equipment 4 and supplied to the pistons 3 of the reciprocating engine 1.

Of course, the exact connection method of the air pipe is not limited to the instance illustrated in FIG. 1 and any number of variations may be possible. Further, the intake air selection valve 11 may be configured by a plurality of valves. For instance, in addition to the position illustrated in the pipe connection instance illustrated in FIG. 1, a valve may also be disposed in the pipe branching off towards the compressor 5 of the high altitude air start equipment 4.

When the reciprocating engine 1 is not stopped during flight of the aircraft 2 and the aircraft 2 is flying normally, air which is not compressed by the compressor 5 is selected to be supplied to the reciprocating engine 1 by opening and closing the intake air selection valve 11. On the other hand, when the reciprocating engine 1 stops during flight of the aircraft 2, in order to restart the reciprocating engine 1, air compressed by the compressor 5 is selected to be supplied to the reciprocating engine 1 by opening and closing the intake air selection valve 11.

The controller 12 is a device configure to control the motor 6 and the intake air selection valve 11. That is, the controller 12 has a function of generating control signals for the motor 6 and the intake air selection valve 11, and outputting the generated control signals to the motor 6 and the intake air selection valve 11. Since the motor 6 is driven by an electrical signal, the control signal of the motor 6 can be generated as an electrical signal. On the other hand, the intake air selection valve 11 may be a valve driven by a desired mechanism such as an electrical, hydraulic pressure, or pneumatic pressure mechanism. Therefore, the control signal of the intake air selection valve 11 can be generated as an electric signal, a hydraulic pressure signal, or a pneumatic pressure signal.

Accordingly, the controller 12 includes at least an electric circuit, and can be configured by a circuit provided with a hydraulic pressure signal circuit or a pneumatic pressure signal circuit as required. The part of the controller 12 that processes digital information can be constituted by an electronic circuit such as a computer in which a program is read.

FIGS. 4(A) and (B) are diagrams illustrating the flow of air during non-operation and operation of the high altitude air start equipment 4 under control of the controller 12 illustrated in FIG. 1.

When the aircraft 2 is flying normally and air not compressed by the compressor 5 is supplied to the reciprocating engine 1, the drive of the motor 6 is stopped under control of the controller 12 while the intake air selection valve 11 is switched under control of the controller 12 so that intake air is supplied to the pistons 3 of the reciprocating engine 1 without passing through the compressor 5 of the high altitude air start equipment 4. That is, when the intake air selection valve 11 is disposed as illustrated in FIG. 1, the intake air selection valve 11 is opened under control of the controller 12.

Therefore, the compressor 5 stops, and the air taken in as illustrated in FIG. 4(A) is supplied to the pistons 3 of the reciprocating engine 1 without passing through the high altitude air start equipment 4 and being compressed. The air that is mixed with fuel gas and does combustion work is released from the pistons 3 of the reciprocating engine 1 as exhaust gas.

On the other hand, when the reciprocating engine 1 stops during flight of the aircraft 2, a control signal for instructing the motor 6 to start operating is outputted from the controller 12. As a result, the motor 6 is driven to rotate the compressor 5. Also outputted is a control signal from the controller 12 to the intake air selection valve 11, and the intake air selection valve 11 is switched so that intake air is supplied to the pistons 3 of the reciprocating engine 1 via the compressor 5 of the high altitude air start equipment 4. That is, when the intake air selection valve 11 is disposed as illustrated in FIG. 1, the intake air selection valve 11 is closed under control of the controller 12.

Therefore, as illustrated in FIG. 4(B), the intake air is compressed via the compressor 5 of the high altitude air start equipment 4, and compressed air that has been boosted to a pressure equivalent to the pressure on the ground is supplied to the pistons 3 of the reciprocating engine 1. The pressurized compressed air is mixed with fuel gas and used to restart the reciprocating engine 1. The compressed air mixed with fuel gas and subjected to work is released from the pistons 3 of the reciprocating engine 1 as exhaust gas.

As described above, the pressure of the compressed air supplied to the pistons 3 of the reciprocating engine 1 is adjusted to the setting pressure of the relief valve 10. The pressure fluctuation of the compressed air supplied to the pistons 3 of the reciprocating engine 1 is mitigated by the air box 9 as illustrated in the graph of FIG. 2. Therefore, even when the aircraft 2 is flying at high altitude, air having a pressure suitable for starting the reciprocating engine 1 can be supplied to each piston 3 of the reciprocating engine 1.

The output of the control signals from the controller 12 to the motor 6 and the intake air selection valve 11 may be performed automatically, or may be performed manually by the operator of the aircraft 2 such as a pilot. When the output of the control signal from the controller 12 to the motor 6 and the intake air selection valve 11 is performed manually, the control information can be supplied to the controller 12 from the input device 13. If the aircraft 2 is a manned aircraft, an input device 13 can be disposed in the cockpit to be manipulated by an operator such as a pilot. On the other hand, if the aircraft 2 is an unmanned aerial vehicle, the input device 13 can be provided at a remote location.

The input device 13 configure to provide the control information for the motor 6 to the controller 12 can be, for instance, a dial or a lever for variably adjusting the output of the motor 6. Alternatively, a switch for switching the motor 6 between the driven state and the stopped state may be used as the input device 13. Further, the input device 13 configure to provide control information of the intake air selection valve 11 to the controller 12 can be configured by, for instance, a switch for switching between an open state and a closed state of the intake air selection valve 11.

Further, when the motor 6 and the intake air selecting valve 11 are automatically controlled by the controller 12, it is possible to automatically detect that the reciprocating engine 1 is stopped during flight of the aircraft 2 by using information that can be obtained from the sensor 14 or an engine control unit (ECU) 15 that controls the reciprocating engine 1. The controller 12 can be provided with functions of automatically driving the motor 6 by outputting control signal to the motor 6 and the intake air selection valve 11, and automatically switching the intake air selection valve 11 so that air compressed by the compressor 5 is supplied to the reciprocating engine 1 when the controller 12 detects that the reciprocating engine 1 has stopped during flight of the aircraft 2 based on the detected signal outputted from the sensor 14 or information obtained from the ECU 15. As a result, when the reciprocating engine 1 stops during flight of the aircraft 2, the intake air selection valve 11 is automatically switched, and the air compressed by the compressor 5 can be supplied to the reciprocating engine 1.

The sensor 14 may be any sensor as long as the sensor can automatically detect a physical quantity that indicates a stop of the reciprocating engine 1. For instance, a rotation sensor or a vibration sensor for detecting rotation of the rotating shaft of the reciprocating engine 1 can be used.

On the other hand, when the controller 12 detects a stop of the reciprocating engine 1 based on information obtained from the ECU 15, when an instruction to restart the reciprocating engine 1 is inputted to the ECU 15, information indicating that the instruction information to restart the reciprocating engine 1 is inputted to the ECU 15 can be outputted from the ECU 15 to the controller 12. As a result, the controller 12 can automatically detect that the reciprocating engine 1 has stopped based on the information obtained from the ECU 15.

The high altitude air start equipment 4, the aircraft reciprocating engine 1, and the aircraft 2 as described above are configured to supply air compressed by the compressor 5 to the reciprocating engine 1 so that the reciprocating engine 1 can be started under conditions equivalent to the conditions on the ground.

Effect

Therefore, with the high altitude air start equipment 4, the aircraft reciprocating engine 1, and the aircraft 2, it is possible to supply the reciprocating engine 1 with air having the same air density as air on the ground even when the aircraft 2 is flying at high altitude. Therefore, it is possible to start the reciprocating engine 1 at high altitude by the same operation as the starting of the reciprocating engine 1 on the ground. As a result, the reciprocating engine 1 can be easily restarted during the flight of the aircraft 2, and the burden on the pilots and the like can be reduced.

Further, in the case of restarting the reciprocating engine 1 at high altitude, the risk of undesirable situations, such as a hot start, can be reduced to the same degree as on the ground. As a result, the safety of the aircraft 2 can be improved.

Furthermore, the range of altitudes (i.e., the envelope) for the aircraft 2 at which the reciprocating engine 1 is capable of being started is expanded toward higher altitudes. For this reason, it is possible to shorten the time and the distance of gliding down the aircraft 2 to start the reciprocating engine 1 at high altitude.

Moreover, the high altitude air start equipment 4 can be easily added later to the existing reciprocating engine 1. That is, the high altitude air start equipment 4 can be added to the existing reciprocating engine 1 without extensive modification of the reciprocating engine 1. In particular, it is easy to mount the high altitude air start equipment 4 to a carburetor engine that mixes fuel with air without using a power source such as electricity.

Second Example

Figure 5:
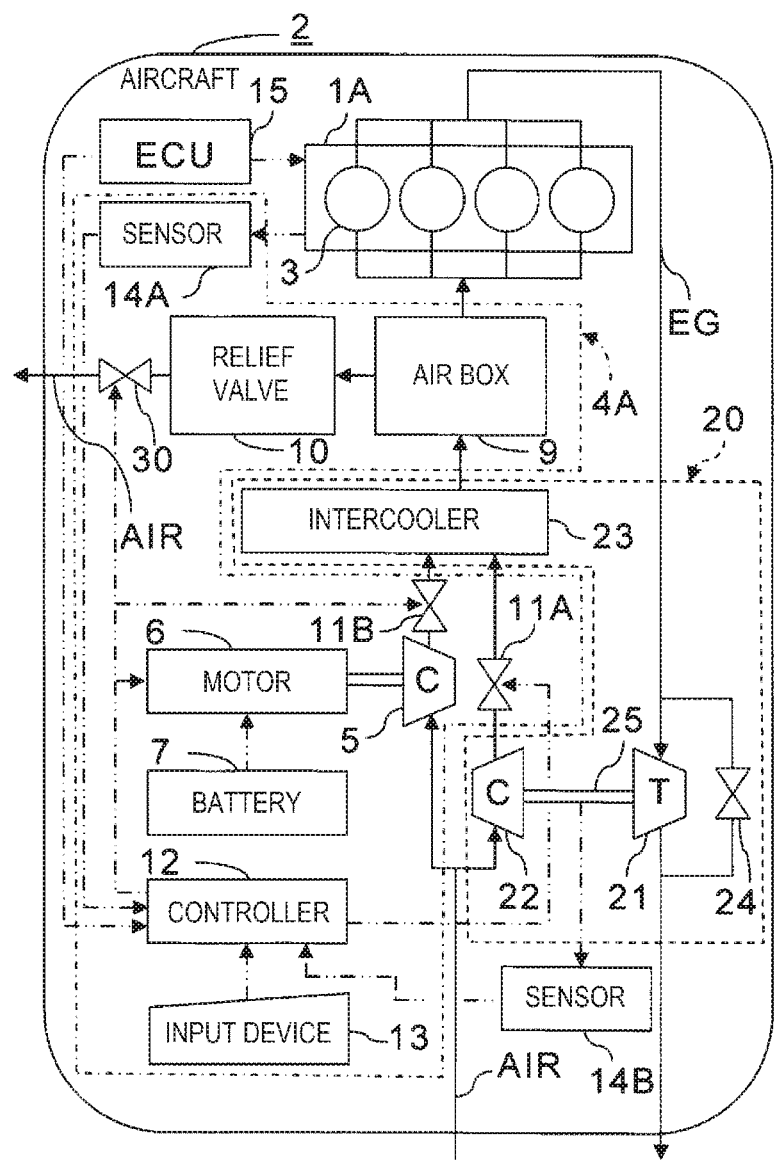
FIG. 5 is a configuration diagram of an aircraft reciprocating engine provided with a high altitude air start equipment according to a second example of the present invention.

FIG. 5 is a configuration diagram of an aircraft reciprocating engine provided with a high altitude air start equipment according to a second example of the present invention.

The second example illustrated in FIG. 5 differs from the first example in that the aircraft reciprocating engine 1A is an engine with a turbocharger 20, and that the high altitude air start equipment 4A is configured to restart the aircraft reciprocating engine 1A with the turbocharger 20 at high altitude. Since other configurations and functions in the second example are not substantially different from those in the first example, the same reference numerals are assigned to the same configurations or corresponding configurations, and description thereof is omitted.

Some aircraft reciprocating engines 1A include a turbocharger 20. The turbocharger 20 is a supercharger that uses exhaust gas energy to boost the pressure of air to supply the pistons 3 of the reciprocating engine 1A. A typical turbocharger 20 comprises a turbine 21, a compressor 22, an intercooler 23, and a wastegate valve 24.

The turbine 21 is disposed in a pipe through which exhaust gas flows. As a result, the turbine 21 is rotated by exhaust gas. The turbine 21 is connected to a compressor 22 by a shaft 25. That is, the turbine 21 and the compressor 22 are fixed to both ends of the common shaft 25. Therefore, the rotation of the turbine 21 is transmitted to the compressor 22 by the shaft 25. As a result, the compressor 22 rotates at the same rotational speed as the rotational speed of the turbine 21 by rotational torque of the turbine 21.

The compressor 22 is disposed in the vicinity of the intake air to be supplied to the pistons 3 of the reciprocating engine 1A. Therefore, the compressor 22 can be driven by using the flow of exhaust gas, and air can be taken in from the atmosphere and compressed. An intercooler 23 is provided to the outlet of the compressor 22. The air compressed by the compressor 22 is cooled in the intercooler 23. The compressed air cooled by the intercooler 23 is supplied to the reciprocating engine 1A.

The exhaust gas pipe splits off on the upstream side of the turbine 21, and a wastegate valve 24 is disposed in the exhaust gas pipe. That is, the wastegate valve 24 is connected in parallel with the turbine 21. The wastegate valve 24 is a valve for adjusting the inflow amount of the exhaust gas to the turbine 21 by diverting part of the exhaust gas. By providing the wastegate valve 24, it is possible to prevent an excessive amount of exhaust gas from flowing into the turbine 21 and rotating the turbine 21 at an excessively high rotation speed.

The reciprocating engine 1 A with the turbocharger 20 having such a configuration can also be provided with the high altitude air start equipment 4A so that the reciprocating engine 1A can be restarted at high altitude. In the case of the reciprocating engine 1A with the turbocharger 20, since the intercooler 23 is provided as a constituent element of the turbocharger 20, the high altitude air start equipment 4A can be configured by the compressor 5, the motor 6, the battery 7, the air box 9, the relief valve 10, the first intake air selection valve 11A, the second intake air selection valve 11B, the controller 12, the input device 13, and the sensors 14A and 14B, as well as an atmosphere release selection valve 30.

The compressor 5, the motor 6 and the battery 7 of the high altitude air start equipment 4A can be provided between the intercooler 23 and the air intake, as in the first example. Similarly to the first example, the air box 9 and the relief valve 10 of the high altitude air start equipment 4A can be provided between the intercooler 23 and the reciprocating engine 1A.

As a result, the outlet side of the compressor 5 of the high altitude air start equipment 4A and the outlet side of the compressor 22 of the turbocharger 20, which is separated from the compressor 5 of the high altitude air start equipment 4A, are both connected to the intercooler 23 by the air pipes. Therefore, the air pipe connected to the outlet side of the compressor 5 of the high altitude air start equipment 4A and the air pipe connected to the outlet side of the compressor 22 of the turbocharger 20 are joined and connected to the inlet side of the intercooler 23.

Between the outlet of the compressor 22 of the turbocharger 20 and the junction of the pipe, a first intake air selection valve 11A is provided. A second intake air selection valve 11B is provided between the outlet of the compressor 5 of the high altitude air start equipment 4A and the junction of the pipe. The first intake air selection valve 11A and the second intake air selection valve 11B may be provided to the inlet side of the compressor 22 of the turbocharger 20 and the inlet side of the compressor 5 of the high altitude air start equipment 4A, respectively.

By opening the first intake air selection valve 11A and closing the second intake air selection valve 11B, air compressed by the compressor 22 of the turbocharger 20 can be supplied to the reciprocating engine 1A through the intercooler 23. On the other hand, if the first intake air selection valve 11A is closed and the second intake air selection valve 11B is opened, air compressed by the compressor 5 of the high altitude air start equipment 4A is supplied to the reciprocating engine 1A through the intercooler 23.

That is, by opening and closing the first intake air selection valve 11A and the second intake air selection valve 11B in conjunction with each other, air compressed by the compressor 5 of the high altitude air start equipment 4A and air compressed by the compressor 22 of the turbocharger 20 can be switched and supplied to the reciprocating engine 1A. In particular, under control of the first intake air selection valve 11A and the second intake air selection valve 11B, air compressed by the compressor 5 of the high altitude air start equipment 4 A can be supplied to each piston 3 of the reciprocating engine 1A comprising a turbocharger 20 having a compressor 22 and a turbine 21 separate from the compressor 5 of the high altitude air start equipment 4A.

The compressor 5, the first intake air selection valve 11A, the second intake air selection valve 11B, and the atmosphere release selection valve 30 of the high altitude air start equipment 4A can be controlled by the controller 12. Control of the compressor 5, the first intake air selection valve 11A, the second intake air selection valve 11B, and the atmosphere release selection valve 30 may be performed manually by operating the input device 13, or may be performed automatically with information outputted from the ECU 15 to the controller 12 or detection signals outputted from the sensor 14A to the controller 12, as explained in the first example.

FIGS. 6(A) and (B) are diagrams illustrating the flow of air during non-operation and operation of the high altitude air start equipment 4A under control of the controller 12 illustrated in FIG. 5.

When the reciprocating engine 1A with the turbocharger 20 is operating normally, it is not necessary to operate the high altitude air start equipment 4A. Therefore, when the reciprocating engine 1A with the turbocharger 20 is operating normally, the first intake air selection valve 11A is opened while the second intake air selection valve 11B is closed. As a result, when the reciprocating engine 1A with the turbocharger 20 is operating normally, air compressed by the compressor 22 of the turbocharger 20 is supplied to the reciprocating engine 1A through the intercooler 23 as illustrated in FIG. 6A.

However, the relief valve 10 of the high altitude air start equipment 4A is connected downstream from the intercooler 23. The relief valve 10 is a valve using a spring that mechanically opens and closes by the air pressure itself to adjust the pressure of air supplied to the reciprocating engine 1A to a setting pressure suitable for restarting the reciprocating engine 1A at high altitude. Therefore, releasing air from the relief valve 10 is unnecessary while compressed air is supplied to the reciprocating engine 1A with the turbocharger 20. It is preferable to provide the atmosphere release selection valve 30 in the air pipe connected to the outlet of the relief valve 10.

If the atmosphere release selection valve 30 is constituted by a controllable valve such as an electric, hydraulic pressure, or pneumatic pressure valve, release of air from the relief valve 10 can be stopped by closing the atmosphere release selection valve 30. In other words, the operation of the relief valve 10 can be disabled by closing the atmosphere release selection valve 30. This can prevent compressed air from leaking from the relief valve 10 while the air compressed by the turbocharger 20 is supplied to the reciprocating engine 1A.

On the other hand, if the reciprocating engine 1A with the turbocharger 20 stops during flight of the aircraft 2, it is necessary to operate the high altitude air start equipment 4A to restart the reciprocating engine 1A. In this case, the first intake air selection valve 11A is closed while the second intake air selection valve 11B is opened. Then, under overall control of the controller 12, rotation of the motor 6 is started in conjunction with the switching operation of the first intake air selection valve 11A and the second intake air selection valve 11B.

As a result, the compressor 5 of the high altitude air start equipment 4A is driven, and the intake air from the outside is compressed. As a result, if the reciprocating engine 1A with the turbocharger 20 stops during flight of the aircraft 2, air compressed by the compressor 5 of the high altitude air start equipment 4A can be supplied to the reciprocating engine 1A through the intercooler 23 as illustrated in FIG. 6(B).

When air compressed by the compressor 5 of the high altitude air start equipment 4A is supplied to the reciprocating engine 1A through the intercooler 23, the atmosphere release selection valve 30 is opened in conjunction with the operation of the compressor 5, the first intake air selection valve 11A, and the second intake air selection valve 11B under overall control of the controller 12. Therefore, when the pressure of compressed air supplied from the compressor 5 of the high altitude air start equipment 4A increases, the air is relieved from the relief valve 10. As a result, air can be supplied to the reciprocating engine 1A at a pressure suitable for starting.

Furthermore, the high altitude air start equipment 4A can be operated not only when the reciprocating engine 1A stops but also when the compressor 22 of the turbocharger 20 malfunctions. That is, when the compressor 22 of the turbocharger 20 malfunctions, the compressor 5 of the high altitude air start equipment 4A can be used instead.

When the compressor 22 of the turbocharger 20 malfunctions, the first intake air selection valve 11A and the atmospheric release selection valve 30 can be closed while the second intake air selection valve 11B can be opened under overall control of the controller 12. Further, the motor 6 can be rotated to operate the compressor 5 of the high altitude air start equipment 4A.

By doing so, air compressed by the compressor 5 of the high altitude air start equipment 4A can be supplied to the reciprocating engine 1A. Moreover, since the atmosphere release selection valve 30 is closed, air is not released from the relief valve 10. For this reason, even though the compressor 22 of the turbocharger 20 malfunctions, it is possible to compensate for insufficient air from the compressor 5 of the high altitude air start equipment 4A. As a result, it is possible to temporarily maintain the thrust of the aircraft 2 together with the output of the reciprocating engine 1A.

Malfunction of the compressor 22 of the turbocharger 20 can be automatically detected in the controller 12 based on a detection signal detected by a rotation sensor for detecting rotation of the shaft 25, a torque sensor for detecting rotational torque of the shaft 25, or any sensor 14B, such as a pressure meter, for measuring pressure of compressed air discharged from the compressor 22, or a flow meter, for measuring the flow rate of compressed air. The controller 12 can be provided with a function of automatically switching the first intake air selection valve 11A, the second intake air selection valve 11B, and the atmosphere release selection valve 30 so that when malfunction of the compressor 22 of the turbocharger 20 is detected, the motor 6 is automatically driven and air compressed by the compressor 5 of the high altitude air start equipment 4A is supplied to the reciprocating engine 1A at a suitable pressure. As a result, the safety of the aircraft 2 can be improved by driving the compressor 5 of the high altitude air start equipment 4A to maintain the output of the reciprocating engine 1A even when the compressor 22 of the turbocharger 20 malfunctions.

In the second example described above, the high altitude air start equipment 4A is provided so that the aircraft reciprocating engine 1A with the turbocharger 20 can be started at high altitude. Further, when the compressor 22 of the turbocharger 20 malfunctions, the compressor 5 of the high altitude air start equipment 4A can be used instead.

Therefore, according to the second example, in addition to the same effect as that of being explained in the first example, it is possible to obtain an effect in which the reciprocating engine 1A can be restarted at a higher altitude position when the aircraft reciprocating engine 1A with the turbocharger 20, being disposed in the aircraft 2 flying at a high altitude, stops during flight.

Third Example

Figure 7:
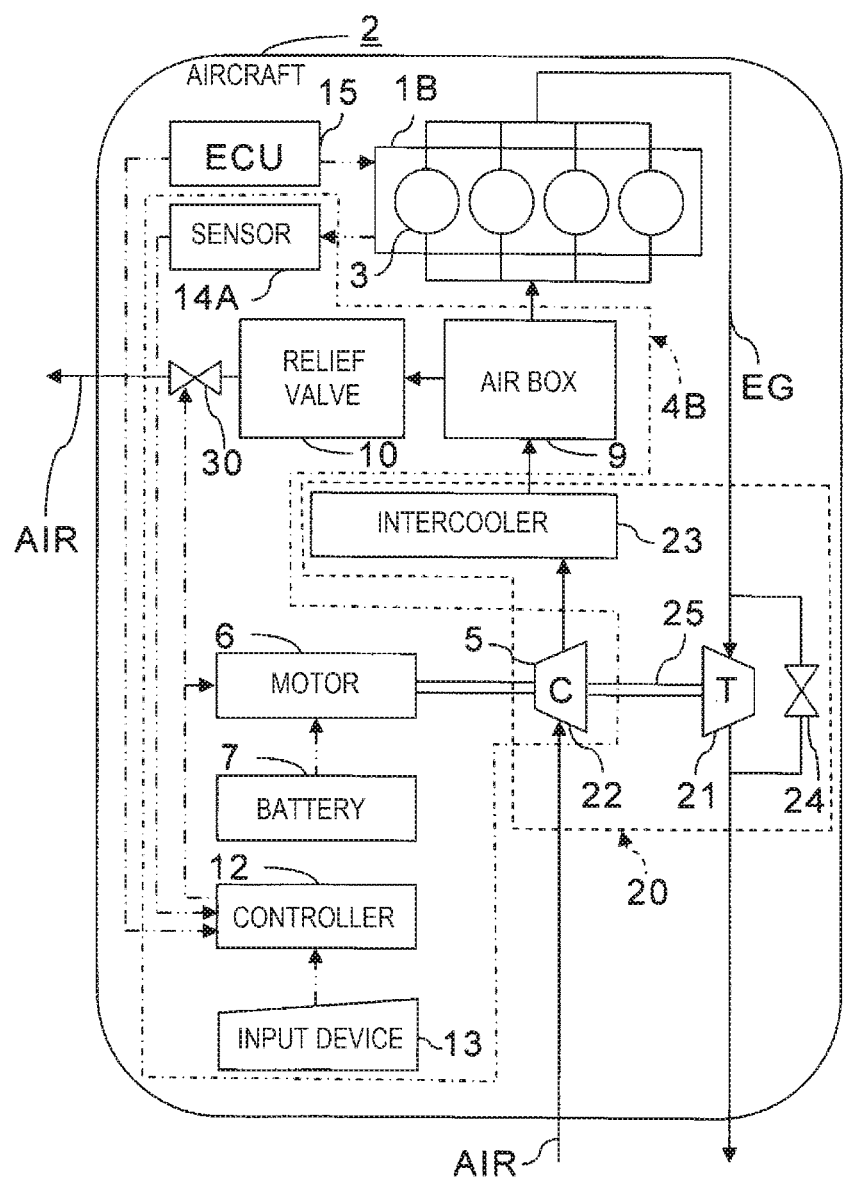
FIG. 7 is a configuration diagram of an aircraft reciprocating engine provided with a high altitude air start equipment according to a third example of the present invention.

FIG. 7 is a configuration diagram of an aircraft reciprocating engine with a high altitude air start equipment according to a third example of the present invention.

The third example illustrated in FIG. 7 differs from the second example in that functions of the compressor 22 of the turbocharger 20 and the compressor 5 of the high altitude air start equipment 4B are fulfilled with a shared unit. Since other configurations and functions in the third example are not substantially different from those in the second example, the same reference numerals are assigned to the same configurations or corresponding configurations, and description thereof is omitted.

As illustrated in FIG. 7, when the reciprocating engine 1B including the turbocharger 20 having the compressor 22 and the turbine 21 is to be started at high altitude by the high altitude air start equipment 4B, the compressor 22 of the turbocharger 20 can be used as the compressor 5 of the high altitude air start equipment 4B.

In this case, when the reciprocating engine 1B stops during flight of the aircraft 2, power is supplied from the motor 6 to the compressor 5, 22. Therefore, even if the flow rate of exhaust gas decreases and rotational speed of the turbine 21 decreases with the stop of the reciprocating engine 1B, the compressor 5, 22 can be rotated at a suitable rotational speed by driving the motor 6. Further, if the reciprocating engine 1B stops during flight of the aircraft 2, the atmosphere release selection valve 30 can be opened. As a result, the pressure of air supplied to the reciprocating engine 1B can be adjusted to a pressure suitable for starting the reciprocating engine 1B.

Operation of the motor 6 and the atmosphere release selection valve 30 may be performed manually or automatically by operation of the input device 13. In the case of automatic control of the motor 6 and the atmosphere release selection valve 30, the controller 12 can be provided with a function of automatically driving the motor 6 when the reciprocating engine 1B is detected to have stopped during flight of the aircraft 2, thereby supplying power from the motor 6 to the compressor 5, 22.

With the third example described above, the number of components of the aircraft 2 can be reduced and the configuration can be simplified as compared with the second example. This leads to weight reduction of the aircraft 2.

Other Examples

Although specific examples have been described, the described examples are merely instances and do not limit the scope of the invention. The novel methods and apparatuses described herein may be embodied in a variety of other manners. Various omissions, substitutions, and changes may be made to the forms of the methods and apparatuses described herein without departing from the spirit of the present invention. The appended claims and their equivalents include such various forms and modifications as fall within the scope and spirit of the present invention.

The invention claimed is:

1. A high altitude air start equipment for an aircraft reciprocating engine, comprising:
    a compressor configured to suck and compress air, and supply the compressed air to the aircraft reciprocating engine;
    a motor configured to supply the compressed air to the reciprocating engine to restart the reciprocating engine or to restore output by outputting rotational power to the compressor when the reciprocating engine stops or malfunctions during flight of the aircraft;
    a valve configured to switch between supplying air compressed by the compressor to the reciprocating engine and supplying air uncompressed by the compressor to the reciprocating engine; and
    a controller configured, when the reciprocating engine stops or malfunctions during flight of the aircraft, to automatically drive the motor, and to automatically switch the valve so that the air compressed by the compressor is supplied to the reciprocating engine,
    an air box disposed between the compressor and the reciprocating engine, the air box being configured to mitigate pressure fluctuations of the compressed air supplied from the compressor to the reciprocating engine,
    wherein a capacity of the compressor is determined to be a capacity capable of supplying the compressed air to the reciprocating engine at a pressure within a pressure range of air required for restarting the reciprocating engine during flight of the aircraft,
    wherein a size of the air box is determined such that the compressed air supplied to the reciprocating engine to restart the reciprocating engine during flight of the aircraft is at the pressure within the pressure range.

2. The high altitude air start equipment for the aircraft reciprocating engine of claim 1, further comprising:
    a relief valve connected directly or indirectly to a pipe of the compressed air connecting the compressor and the reciprocating engine, the relief valve being configured to regulate pressure of the compressed air supplied from the compressor to the reciprocating engine by releasing an excess of the compressed air.

3. The high altitude air start equipment for the aircraft reciprocating engine of claim 2, wherein the pressure of the compressed air regulated by the relief valve is set to atmospheric pressure.

4. The high altitude air start equipment for the aircraft reciprocating engine according to claim 1, further comprising an intercooler disposed between the compressor and the reciprocating engine, the intercooler being configured to cool air compressed by the compressor.

5. The high altitude air start equipment for the aircraft reciprocating engine according to claim 1, wherein
    the reciprocating engine comprises a turbocharger comprising a turbine and a compressor different from the compressor of the high altitude air start equipment, and the compressor of the high altitude air start equipment is configured to supply compressed air to each piston of the reciprocating engine, and
    the valve is configured to switch the compressed air to be supplied to the reciprocating engine between the air compressed by the compressor of the high altitude air start equipment and air compressed by the compressor of the turbocharger.

6. The high altitude air start equipment for the aircraft reciprocating engine of claim 1, wherein the controller is configured to supply a power from the motor to the compressor when the reciprocating engine is detected to stop during flight of the aircraft, wherein
    the reciprocating engine comprises a turbocharger comprising a compressor and a turbine, and the compressor of the turbocharger is used as the compressor of the high altitude air start equipment starter.

7. An aircraft reciprocating engine provided with the high altitude air start equipment according to claim 1.

8. An aircraft comprising the aircraft reciprocating engine of claim 7.

* * * * *